(12) United States Patent
Bossut (10) Patent No.: US 6,239,807 B1
(45) Date of Patent: May 29, 2001

(54) METHOD AND SYSTEM FOR MULTI-RESOLUTION TEXTURE MAPPING

(75) Inventor: Philippe Joseph Ghislain Bossut, Berkeley, CA (US)

(73) Assignee: MGI Software Corporation, Richmond Hill (CA)

( * ) Notice: Subject to any disclaimer, the term of this patent is extended or adjusted under 35 U.S.C. 154(b) by 0 days.

(21) Appl. No.: 09/039,059

(22) Filed: Mar. 13, 1998

(51) Int. Cl.⁷ ..................................................... G06T 11/40
(52) U.S. Cl. ............................................. 345/430; 345/435
(58) Field of Search ..................................... 345/430, 435, 345/118

(56) References Cited

U.S. PATENT DOCUMENTS

| | | | | |
|---|---|---|---|---|
| 5,557,684 | * | 9/1996 | Wang et al. ........................ | 382/107 |
| 5,706,417 | * | 1/1998 | Adelson .............................. | 395/129 |
| 5,790,708 | * | 8/1998 | Delean ................................ | 382/276 |
| 5,907,640 | * | 5/1999 | Delean ................................ | 382/276 |
| 5,956,043 | * | 9/1999 | Jensen ................................ | 345/430 |

* cited by examiner

*Primary Examiner*—Mark Zimmerman
*Assistant Examiner*—Mano Padmanabhan
(74) *Attorney, Agent, or Firm*—Blakely, Sokoloff, Taylor & Zafman (57) ABSTRACT

A method for applying textures to a composite image in a computerized multi-resolution paint system, the method including obtaining a stack of image rendering layers to be composited, and applying at least one texture map to at least one selected layer in the stack.

32 Claims, 5 Drawing Sheets

METHOD AND SYSTEM FOR MULTI-RESOLUTION TEXTURE MAPPING

FIELD OF THE INVENTION

The present invention relates to image compositing and more particularly to texture mapping.

BACKGROUND OF THE INVENTION

The following publications are believed to be generally relevant to the field of the invention.
1. Delean, Bruno, *Method and System for Image Processing*, PCT International Publication WO 94/22101, published Sept. 29, 1994.
2. Ebert, David S. et al., *Texture and Modeling: A Procedural Approach*, AP Professional, 1994.
3. Perlin, Ken and Velho, Luiz, Live Paint: Painting with Procedural Multiscale Textures, in SIGGRAPH 95 Conference Proceedings, *COMPUTER GRAPHICS Proceedings, Annual Conference Series*, 1995, pgs. 153–160.
4. Watt, Alan and Watt, Mark, *Advanced Animation and Rendering Techniques: Theory and Practice*, Addison Wesley, 1992.

Texture mapping was initially developed for rendering realistic three dimensional computer graphics. Three-dimensional rendering techniques tend to produce smoothly shaded images based on the geometry of the scene. To add complexity to the final image without complicating the geometry (and thus slowing down the renderer), texture maps were applied to the objects.

When computing color for a particular point on a three-dimensional surface, the renderer can sample a texture map to alter any surface characteristic. The most common effect is to alter the color of the surface using an image as the texture map. The resulting surface appears to have the image pasted on it. This is referred to as "pattern mapping." Another popular method is to use the texture sample to perturb the surface normal. After shading, this causes the surface to appear bumpy, and hence this technique is often referred to as "bump mapping."

There are two standard ways to produce a texture map: using an image or using a procedure. When an image is used for texture mapping, the image is often small, and is tiled in both directions to complete a full texture map. Use of an image is advantageous in that it gives an artist a great deal of control, since any image can be used, and real world textures can be scanned for use as images. However, use of an image has a disadvantage in that the image used has a finite resolution, and thus cannot be magnified much beyond this finite resolution without destroying the textured look.

A procedural texture is generated by a recursive algorithm, and as such the algorithm can be iterated repeatedly to produce a texture map of unlimited resolution. The parameters of the basic algorithm can be varied, resulting in many interesting by-product textures. Procedural textures are known for their ability to simulate natural textures such as wood, marble and rock, as well as noise. Information about procedural textures appears in the aforesaid publication by Ebert, David S. et al., Texturing and Modeling: A Procedural Approach, AP Professional, 1994, the disclosure of which is hereby incorporated by reference.

Artists often like to paint using brush strokes that are not flat colors, and they often like to apply texture effects to images that are being composited together. Painting with texture effects is available in commercial products such as Adobe PHOTOSHOP® and FRACTAL DESIGN PAINTER®. These products do not use resolution-independent techniques; rather, the texture map resolution is re-sampled to a final fixed resolution when painting. Such techniques have the drawback of being slow when painting large areas with fine textures.

Resolution-independent techniques for texture mapping are available in script based programs, such as FRACTAL DESIGN EXPRESSION®, but they do not allow for fine detail retouching actions.

The FITS model described in the aforesaid Delean reference, the disclosure of which is hereby incorporated by reference, is an example of a multi-resolution paint system. This model introduces two sets of tools for imposing texture and noise. The first tool is a texture option to modulate the opacity of a brush stroke. The second tool is a noise option to modulate the grain of an image.

A drawback with the FITS texture option is that it only applies to the opacity. This limitation is inherent in the underlying equation that is fundamental to the FITS rendering model. A drawback with the FITS noise option is that it is applied globally to the entire composite after rendering, and cannot be controlled on a per layer basis.

The need for resolution-independent textured brush strokes has been identified by Perlin and others. As indicated in the aforesaid publication of Perlin, the disclosure of which is hereby incorporated by reference, Perlin proposed a resolution-independent self refining method. A drawback with Perlin's technique is that it does not deal with textures of different geometries. That is, Perlin deals only with textures applied "flat" on the image, there being no facility to permit a geometric transformation to be applied to the texture.

Another drawback with Perlin's technique is that it does not handle interactions between textures and images. For example, it cannot apply texture to perturb the shape or surface of an image.

Moreover, Perlin deals only with bandpass multi-resolution pyramids, and the "lazy evaluation" strategy, which means that the textures are considered as images that refine themselves statically in a potentially infinite memory. This can create huge images.

SUMMARY OF THE INVENTION

The present invention was created in order to overcome shortcomings in texture generation within multi-resolution paint models. In one preferred embodiment thereof, the present invention presents a powerful way to render textured brush strokes in a resolution-independent context. In the FITS resolution-independent model, brush strokes are smooth. In fact, they must be smooth in order for the core interpolation process of FITS to work. Textured and noisy images are not smooth, however. It is their nature to be highly fluctuating.

The present invention overcomes this problem by presenting (i) a way to mix interpolated and non-interpolated effects, and (2) a model to modulate opacity, color and image shape and surface. The invention operates by decomposing a layer stack to be rendered, into linked sub-stacks that are composited together, rather than compositing the whole single stack at once. The invention also allows use of both image-based textures and procedural textures for any of the texture mapping.

There is thus provided in accordance with a preferred embodiment of the present invention a method for applying textures to a composite image in a computerized multi-resolution paint system, the method including obtaining a stack of image rendering layers to be composited, and applying at least one texture map to at least one selected layer in the stack.

Moreover in accordance with a preferred embodiment of the present invention the texture map is selected from texture maps which modulate color, opacity, shape and distortion.

Additionally in accordance with a preferred embodiment of the present invention the stack of image rendering layers contains image layers and paint layers.

Further in accordance with a preferred embodiment of the present invention the paint layers contain edit parameters for performing image edit effects.

Still further in accordance with a preferred embodiment of the present invention the image layers contain images to import into the composite image.

Moreover in accordance with a preferred embodiment of the present invention the at least one texture map is a procedural texture map.

Additionally in accordance with a preferred embodiment of the present invention the at least one texture map is an image tiled horizontally and vertically.

Further in accordance with a preferred embodiment of the present invention the at least one texture map is a bump map for modulating shape.

Still further in accordance with a preferred embodiment of the present invention the at least one texture map is a distortion map for image refraction.

Moreover in accordance with a preferred embodiment of the present invention the at least one texture map is used in computations which incorporate one of the layers into the next layer in the stack of layers.

Additionally in accordance with a preferred embodiment of the present invention the method also includes the step of partitioning the stack of image rendering layers into a plurality of sub-stacks of image rendering layers linked to one another, at least all but one sub-stack being characterized in that the parameters in all layers in the sub-stack other than the last layer in the sub-stack are interpolable parameters.

Further in accordance with a preferred embodiment of the present invention pixel data on the stack of image rendering layers is organized into lists of data linked to one another which are created at each pixel location within the composite image, each list of data corresponding to a sub-stacks of layers.

Still further in accordance with a preferred embodiment of the present invention the pixel data is stored within a single grid.

Moreover in accordance with a preferred embodiment of the present invention the stack of image rendering layers includes layers that contain image editing parameters, which are calculated at selected pixel locations and interpolated for remaining pixel locations within a pixel grid, and layers that contain texture data, which data is calculated at each pixel location in the pixel grid.

Additionally in accordance with a preferred embodiment of the present invention the multi-resolution paint system is a FITS-based system.

There is also provided in accordance with a preferred embodiment of the present invention a method for image compositing in a computerized system, the method including obtaining a stack of image rendering layers to be composited, wherein the stack of image rendering layers includes layers that contain data, which data is calculated at selected pixel locations and interpolated for remaining pixel locations within a pixel grid, and layers that contain data, which data is calculated at each pixel location in the pixel grid, and calculating pixel values at locations within the pixel grid based upon the data.

Moreover in accordance with a preferred embodiment of the present invention the data which is calculated at each pixel location includes texture map data.

Additionally in accordance with a preferred embodiment of the present invention the texture map data is used to modulate opacity.

Further in accordance with a preferred embodiment of the present invention the method also includes the step of partitioning the stack of image rendering layers into a plurality of sub-stacks of image rendering layers linked to one another, at least all but one sub-stack being characterized in that all layers in the sub-stack other than the last layer in the sub-stack contain data, which data is calculated at selected pixel locations and interpolated for remaining pixel locations within the pixel grid.

Still further in accordance with a preferred embodiment of the present invention pixel data on the stack of image rendering layers is organized into lists of data linked to one another which are created at each pixel location within a composite image, each list of data corresponding to a sub-stacks of layers.

Moreover in accordance with a preferred embodiment of the present invention the step of calculating pixel values is carried out for each of the sub-stacks.

Additionally in accordance with a preferred embodiment of the present invention the image rendering layers are layers for a FITS-based raster image processing system.

There is also provided in accordance with a preferred embodiment of the present invention a system for applying textures to a composite image in a computerized multi-resolution paint system, the system including an image providing unit obtaining a stack of image rendering layers to be composited, and a texture mapper applying at least one texture map to at least one selected layer in the stack.

Moreover in accordance with a preferred embodiment of the present invention the texture map is selected from texture maps which modulate color, opacity, shape and distortion.

Additionally in accordance with a preferred embodiment of the present invention the stack of image rendering layers contains image layers and paint layers.

Further in accordance with a preferred embodiment of the present invention the paint layers contain edit parameters for performing image edit effects.

Still further in accordance with a preferred embodiment of the present invention the image layers contain images to import into the composite image.

Moreover in accordance with a preferred embodiment of the present invention the at least one texture map is a procedural texture map.

Additionally in accordance with a preferred embodiment of the present invention the at least one texture map is an image tiled horizontally and vertically.

Further in accordance with a preferred embodiment of the present invention the at least one texture map is a bump map for modulating shape.

Still further in accordance with a preferred embodiment of the present invention the at least one texture map is a distortion map for image refraction.

Moreover in accordance with a preferred embodiment of the present invention the at least one texture map is used in computations which incorporate one of the layers into the next layer in the stack of layers.

Additionally in accordance with a preferred embodiment of the present invention the system also includes a partitioner partitioning the stack of image rendering layers into a plurality of sub-stacks of image rendering layers in to one another, at least all but one sub-stack being characterized in that the parameters in all layers in the sub-stack other than the last layer in the sub-stack are interpolable parameters.

Further in accordance with a preferred embodiment of the present invention the pixel data on the stack of image rendering layers is organized into lists of data linked to one another which are created at each pixel location within the composite image, each list of data corresponding to a sub-stacks of layers.

Still further in accordance with a preferred embodiment of the present invention the pixel data is stored within a single grid.

Moreover in accordance with a preferred embodiment of the present invention the stack of image rendering layers includes layers that contain image editing parameters, which are calculated at selected pixel locations and interpolated for remaining pixel locations within a pixel grid, and layers that contain texture data, which data is calculated at each pixel location in the pixel grid.

Additionally in accordance with a preferred embodiment of the present invention the multi-resolution paint system is a FITS-based system.

There is also provided in accordance with a preferred embodiment of the present invention a system for image compositing in a computerized system, the system including an image provider obtaining a stack of image rendering layers to be composited, wherein the stack of image rendering layers includes layers that contain data, which data is calculated at selected pixel locations and interpolated for remaining pixel locations within a pixel grid, and layers that contain data, which data is calculated at each pixel location in the pixel grid, and a pixel value calculator calculating pixel values at locations within the pixel grid based upon the data.

Moreover in accordance with a preferred embodiment of the present invention the data which is calculated at each pixel location includes texture map data.

Additionally in accordance with a preferred embodiment of the present invention the texture map data is used to modulate opacity.

Further in accordance with a preferred embodiment of the present invention the system also includes a partitioner partitioning the stack of image rendering layers into a plurality of sub-stacks of image rendering layers linked to one another, at least all but one sub-stack being characterized in that all layers in the sub-stack other than the last layer in the sub-stack contain data, which data is calculated at selected pixel locations and interpolated for remaining pixel locations within the pixel grid.

Still further in accordance with a preferred embodiment of the present invention pixel data on said stack of image rendering layers is organized into lists of data linked to one another which are created at each pixel location within a composite image, each list of data corresponding to a sub-stacks of layers.

Moreover in accordance with a preferred embodiment of the present invention the step of calculating pixel values is carried out for each of the sub-stacks.

Additionally in accordance with a preferred embodiment of the present invention the image rendering layers are layers for a FITS-based raster image processing system.

DETAILED DESCRIPTION OF PREFERRED EMBODIMENTS

The present invention describes a method for applying textures within a digital image compositing system. It provides for multiple texture application to color, to opacity, to distortion of shape and surface, and to other features of an image. It also provides a user interface for specifying parameters of the textures. As will be seen below, the present invention applies to a variety of compositing techniques. However, for purposes of clarity and conciseness it will be presented in the context of a specific compositing technique known as FITS, this being a preferred embodiment. It is understood that the present invention is not limited to FITS applications or techniques.

Brief Overview of FITS RIP

In the aforementioned Delean PCT Publication WO 94/22101 entitled "Method and System for Image Processing," the contents of which are hereby incorporated by reference, a raster image processing system is described which composites a stack of image rendering layers. Generally, these image rendering layers (also referred to simply as "layers" hereinbelow) are of two types—image layers and paint layers. Image layers contain digital images which are to be incorporated into the composite image. Paint layers contain editing instructions which correspond to user modifications such as brush strokes, re-sizing, sharpening, contrasting, etc., which are described on pages 32–35 of the above-referenced Delean publication.

The Delean system is particularly advantageous in that it can be applied in a resolution-independent fashion, and thus can be used for image editing at multiple resolutions, displaying at any resolution and printing at any resolution. As such, the Delean system offers the user the capability of touching up coarse details at one resolution, and fine details at a magnified resolution.

As described on pages 14–17 of the above-referenced Delean publication, the Delean system operates by using an image format, referred to as IVUE, which stores multiple resolutions of a high quality image, in the form of an image pyramid, and stores the edits in mathematical functional form in a tree data structure. The edits thus occupy a small amount of storage, and their application does not destroy the original image. If the user so desires, some or all of the edits can be ignored, and the corresponding edit effect is eliminated. Moreover, this non-destructive editing is accomplished without use of intermediate image stores, and thus does not require the large amounts of memory typically required by conventional digital image compositing systems.

The Delean system uses an innovative technology referred to as "functional interpolating transfer system" (FITS), which relies upon a basic elementary operation for transition from layer i−1 to layer i:

$$F_i(x,y)=\alpha_i(x,y)F_{i-1}(x,y)+\beta_i(x,y)I_i(P_i(xy))+\gamma_i(x,y) \quad (1)$$

The index i refers to the successive layers. $F_i$ and $F_{i-1}$ denote the pixel values for layers i and i−1, respectively. $I_i$ denotes an imported image, and $P_i$ denotes a geometric transformation such as rotation, scaling and deformation. The coefficients $\alpha_i$ and $\beta_i$ denote opacity levels, and $\gamma_i$ denotes an external color term. Most editing and compositing operations are such that $\alpha_i=1-\beta_i$, and this will be assumed to hold in the ensuing discussion.

Equation (1) is recursive in nature, and can be iterated algebraically through all the layers i=1, 2, . . . , m in the layer stack, to arrive at an explicit form $$F(x,y) = \alpha'_0 F_0(x,y) + \sum_{i=1}^{m} \alpha'_i(x,y)\beta_i(x,y)I_i(P_i(x,y)) + \gamma'(x,y) \quad (2)$$

where $F_0$ is the initial layer 0 image, which could be an all black background, and the primed quantities are given by $$\alpha'_i = \prod_{j=i+1}^{m} \alpha_j, \quad \gamma'_i = \sum_{i=1}^{m} \alpha'_i \gamma_i \quad (3)$$

Equation (2) is the fundamental FITS equation used in image rendering, for display or print. The coordinates (x,y) are real-valued, rather than integer valued, making them discretizable to any resolution. This is consistent with the resolution-independence inherent in the FITS model.

As explained on pages 29 and 30 of the aforesaid Delean publication, with reference to FIG. 10 therein, the FITS parameters $\alpha'_i$ and $\gamma_i'$ tend to be smoothly varying parameters of (x,y), as they represent editing effects such as brush strokes. Consequently, the FITS algorithm only evaluates these FITS parameters at selected grid points (x,y), typically one evaluation in every 4×4 block of pixel locations. This serves to speed up the RIP processing, since computation of these parameters can be elaborate. The values of the FITS parameters at the other grid points are obtained by bilinearly interpolating the values at the selected grid points. Thereafter, when all the FITS parameter values are determined, Equation (2) is used to compute pixel values at all pixel locations—hence, the name "functional interpolating transfer system" (FITS) for the technology. That is, the FITS RIP interpolates the functional parameters, rather than the pixel values themselves. The latter approach does not work well, as it destroys high frequency details of the image.

Equation (2) is of a local nature, in that F(x,y) only depends on the FITS parameters $\alpha'_i$ and $\gamma_i'$ at the location (x, y), and there is no coupling between different locations. Moreover, terms in the sum for which $\beta_i(x,y)=0$ need not be evaluated in arriving at F(x,y). In turn this means that in order to render a desired portion of the image, it is only necessary to apply Equation (2) at the points (x,y) that correspond to pixel locations in the desired portion. Thus, it may be appreciated that FITS does not require rendering of the entire image in order to view a portion thereof. As a result, the FITS RIP can be carried out very quickly, giving FITS a significant advantage over conventional techniques which require up to several minutes for the RIP operation.

Impact of Texture Application on FITS RIP

Texture effects can be generated by using texture maps, which are arrays of values corresponding to pixel locations, to modulate opacity and color, as well as to perturb the shape and surface of an image. General texture mapping techniques appear in the aforementioned reference of Watt, Alan and Mark, Advanced Animation and Rendering Techniques: Theory and Practice, Addison-Wesley, 1992, the disclosure of which is hereby incorporated by reference.

As described above, there are two standard ways to produce a texture map: using an image or using a procedure. Both the image-based and procedural based texture generation lead to a texture map of the form T(x,y). Unlike the FITS parameters which are smooth, texture parameters are typically high frequency modulations, which would lose their character if computed by interpolation. Thus, whereas the FITS parameters only need to be generated at selected grid points, the texture values need to be generated for every pixel location.

Texture maps can be used to modulate color, opacity, shape and surface, and other characteristics of an image.

I. Color Modulation

As can be seen from Equation (1), without the presence of texture, color values propagate through the layers according to an equation such as $$c_i \leftarrow (1-\beta_i)c_{i-1}+\beta_i c_i \quad (4)$$

where $c_i$ denotes the color of layer i. Equation (4) is applied at each relevant pixel location. Use of a texture map $T_i^c$ to modulate the color can be achieved by modifying equation (4) to $$c_i \leftarrow (1-\beta_i)c_{i-1}+\beta_i M^c(c_i,T_i^c) \quad (5)$$

where $M^c$ denotes a color modulation function. An example of such a modulation function is $$M^c(c,T)=\text{clamp}(c+\delta T) \quad (6)$$

where c is a color value, T is a texture value, and clamp() denotes a function which clips values which are outside of the valid color range. In a preferred embodiment of the present invention, the valid color range is taken to be 0 to 1, the values of T range from −1 to 1, and the parameter $\delta$ ranges from 0 to 1. If the texture is a random noise, for example, then a $\delta$ value near 0 produces subtle variations in the original color, whereas a $\delta$ value near 1 produces variations ranging from no color value to completely saturated color.

Equation (5) represents the application of texture map $T_i^c$ to modulate the color of layer i, while combining layer i with the previous layers.

II. Opacity Modulation

To texture map the opacity of a layer, the opacity term $\beta_i$ in Equation (5) is modified to $M^o(\beta_i,T_i^o)$, where $T^o$ is a second texture map. The function $M^o$ is an opacity modulation function, an example of which is Equation (6) wherein $M^o$ is substituted for $M^c$.

III. Surface Modulation

To modulate the surface appearance of an image, one can use "bump maps," which give the texture a three-dimensional look. Bump maps operate by means of shading functions.

As described in the aforementioned Watson publication, the disclosure of which is hereby incorporated by reference, a typical bump mapping is based upon a light source, and assumes the form $$c = l_a r_a C_a + l_d r_d C_d (N,L) + l_s r_s C_s (R,V)^n \quad (7)$$

where:
c is the color at a given pixel location;
$l_a$, $l_d$ and $l_s$ are the brightness of the light source for ambient, diffuse and specular light, respectively;
$r_a$, $r_d$ and $r_s$ are the reflectances of the surface for ambient, diffuse and specular light, respectively;
$C_a$, $C_d$, and $C_s$ are the surface colors for ambient, diffuse and specular light, respectively;
N is the unit normal vector of the surface at the given pixel location;
L is the vector from the surface to the light;
R is the light vector reflected through the normal vector at the given pixel location;
V is the vector to the viewer at the given pixel location;
n is the "specular-reflection exponent," often called the "shininess;" and
<> denotes the vector inner product.

In a preferred embodiment of the present invention, the following simplifying assumptions are made:
The default surface normal is pointing up away from the page. This is the three-dimensional vector N=(0,0,1).
To give the page uniform illumination, the light source is considered to be at an infinite distance, and thus the vector L from any point on the page to the light source is a (user-determined) constant. Under this assumption, the formula for R is given by $$R = 2(N,L)N - L \quad (8)$$

The vector to the viewer is V=(0,0,1).
There is only one light source, and the various reflectance terms are combined to $S_b = l_a r_a$ (surface brightness), $l_b = l_d r_d$ (lighting brightness) and $h_b = l_s r_s$ (highlight brightness).
The colors $C_a$ and $C_d$ are both equal to the image color prior to modification, and $C_s = 1$ (pure white).
Thus the overall bump mapping reduces to $$c \leftarrow s_b c + l_b c(N,L) + h_b (R,V)^n \quad (9)$$

To give the image its textured "bumps," the texture map is used to perturb the normal vector N. The amount of perturbation is based upon the gradient of the texture map, taken as discrete differences in a preferred embodiment. Specifically, $$N = \frac{\left(h\frac{\partial T^b}{\partial x}, h\frac{\partial T^b}{\partial y}, 1\right)}{\sqrt{h^2\left[\left(\frac{\partial T^b}{\partial x}\right)^2 + \left(\frac{\partial T^b}{\partial y}\right)^2\right] + 1}} \quad (10)$$

where $T^b$ is the texture map used for the generating the bumps, h is the height of the bumps, $dT^b/dx = T^b(x,y) - T^b(x-1,y)$ and $dT^b/dy = T^b(x,y) T^b(x,y-1)$.

Combining the color, opacity and surface modulations into a single equation of the form (1) yields the modified elementary operation for transition from layer i−1 to layer i, modified for incorporation of texture:

$$F_i(x,y) = [1 - \beta_i'(x,y)] F_{i-1}(x,y) + \beta_i'(x,y) I_i'(x,y) + \gamma_i(x,y) \quad (11)$$

with $$\beta_i'(x,y) = M_i^o(T_i^o(P_i(x,y)), \beta_i(x,y)) \quad (12)$$

$$I_i'(x,y) = B(M_i^c(T_i^c(P_i(x,y)), I_i(P_i(x,y))), T_i^b) \quad (13)$$

and B is the bump mapping $$B(c, T^b) = s_b c + l_b c(N,L) + h_b (R,V)^n \quad (14)$$

with the normal vector N given according to Equation (10). Equation (11) can be converted to the explicit form of Equation (2), by iterating over all of the layers i=1,2, ..., m. In this explicit form, $\beta_i'$ is used instead of the $\beta_i$ appearing in Equation (2), and $I_i'(x,y)$ is used instead of the term $I_i(P_i(x,y))$ appearing in Equation (2).

Algebraically, replacing $\beta_i$ by $\beta_i'$ in Equation (2) is straightforward. However, it has ramifications in that it complicates the implementation, since the presence of an opacity texture map term in $\beta_i'$ precludes it from being amenable to interpolation. The other texture maps are not problematic, since they only impact the term $I_i'(x,y)$, which is not a FITS parameter sought to be interpolated. Since, in general, most of the layers are not textured, it would not be practical to forgo the interpolation and thereby forfeit the attendant speed advantage which the 4×4 sub-sampling affords, on account of the presence of texture maps at specific levels. Instead, in a preferred embodiment of the present invention, the layer stack, consisting of layers i=1,2, ..., m, is separated into smaller sub-stacks of layers linked to one another.

Specifically, starting with layer 0, the successive layers are added to a sub-stack of layers, until a layer is encountered which involves an opacity texture map. That layer then becomes the last layer in the sub-stack, and the next layer initiates the next sub-stack. Layers which do not involve opacity maps, the FITS parameters of which can be calculated via interpolation, are termed "interpolable layers," and those which do involve opacity maps are termed "non-interpolable layers." Thus the last layers in each sub-stack are the non-interpolable layers—other than in the very last sub-stack, which may end with an interpolable layer if the very last layer is such.

In processing the layers, the parameters $\beta_i'$ for each interpolable layer in a sub-stack are evaluated at the sub-grid pixel locations, and the intermediate values are determined by interpolation. When a non-interpolable layer in a sub-stack is encountered, the parameters $\beta_i'$ are evaluated at every pixel location in the full grid. The pixel values for the entire grid of pixel locations are then calculated by means of Equation (2). These pixel values form the initial layer $F_0$ to be used in Equation (2) for the next sub-stack of layers.

In a preferred embodiment of the present invention, since Equation (2) is local in nature, rather than create separate physical grids for each sub-stack, linked lists of individual samples at each pixel location in the full grid are created. That is, instead of storing separate grids, a single grid is used, with linked lists of data stored at each pixel location. This conserves memory and allows for more generality, in that non-interpolable layers involving texture maps can still be treated as if they were interpolable, at pixel locations where the texture maps do not apply.

Texture mapping can also be applied to distort an image. In this case a two-dimensional refraction texture map $T^r = (T_x^r(x,y), T_y^r(x,y))$ is used to specify a distortion field, so that color at location (x,y) gets replaced with the color at location $(x + T_x^r(x,y), y + T_y^r(x,y))$.

User Interface

The user of a system which implements the texture mapping of the present invention should be able to associate a texture with any appropriate layer—including both painting and image layers. The user should be able to load a texture image, and choose from among a variety of built-in textures. The user should also be able to perform transformations such as rotation, scale and translation, on textures. In addition, if the user chooses to use a procedural texture, then the parameters of the procedure should be user-selectable. The user should have the flexibility of using the same or different texture maps for color, opacity and bumping.

These considerations lead to the following collection of user-selectable parameters for each layer in the layer stack, all of which have been introduced in the above discussion:

choice of 3 textures (from a file or built-in)
parameters of chosen built-in texture
on/off for color, opacity and bump mapping
which texture map to use for color (1, 2 or 3)
which texture map to use for opacity (1, 2 or 3)
which texture map to use for bump mapping (1, 2 or 3)
affine and perspective transformations
texture deviation—"how much texture" (0–100%)
if bump mapping is turned on:
  surface brightness (0+)
  light brightness (0+)
  specular highlight brightness (0+)
  bump height (0+)
  shininess (1+)
  light position (x,y,z)

Discussion of the Figures

Figure 1:
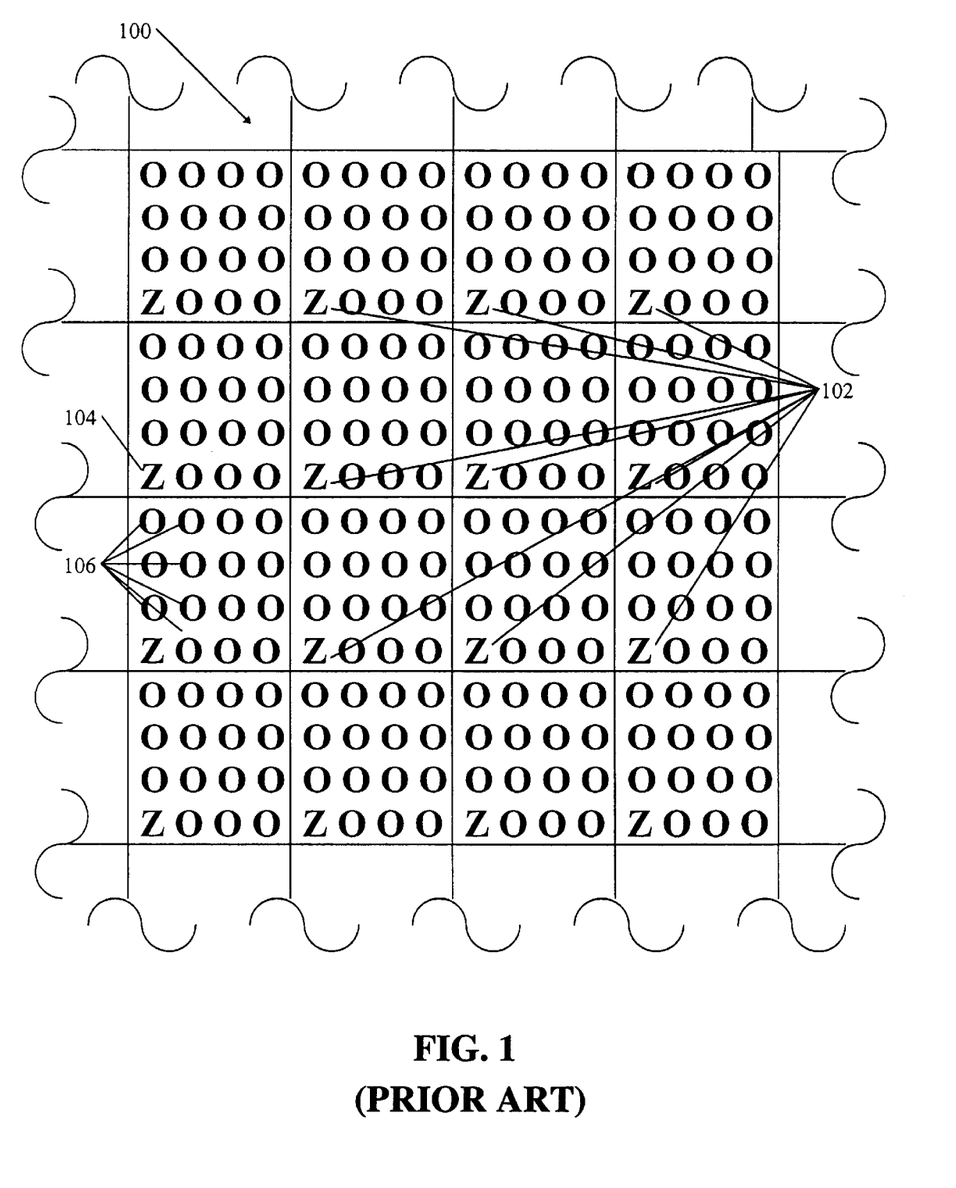
FIG. 1 is an illustration of a prior art full pixel grid including a pixel sub-grid corresponding to a sub-sampling on 4×4 pixel blocks.

FIG. 1 illustrates a pixel grid 100 including a pixel sub-grid 102 consisting of every fourth pixel location in the horizontal and vertical directions, as known in the prior art. The sub-grid is illustrated in terms of 4×4 blocks of pixel locations 104. The selected pixel location in each 4×4 block which belongs to the sub-grid is denoted by "Z." The remaining fifteen pixels 106 of each 4×4 block are denoted by "O." Together the "Z" and "O" pixel locations form the full pixel grid 100. The sub-grid is determined by the "Z" pixel locations alone.

When carrying out the FITS RIP, the editing parameters are only evaluated at the "Z" pixel locations. At the "O" pixel locations, the values of these parameters are obtained by interpolation.

Figure 2:
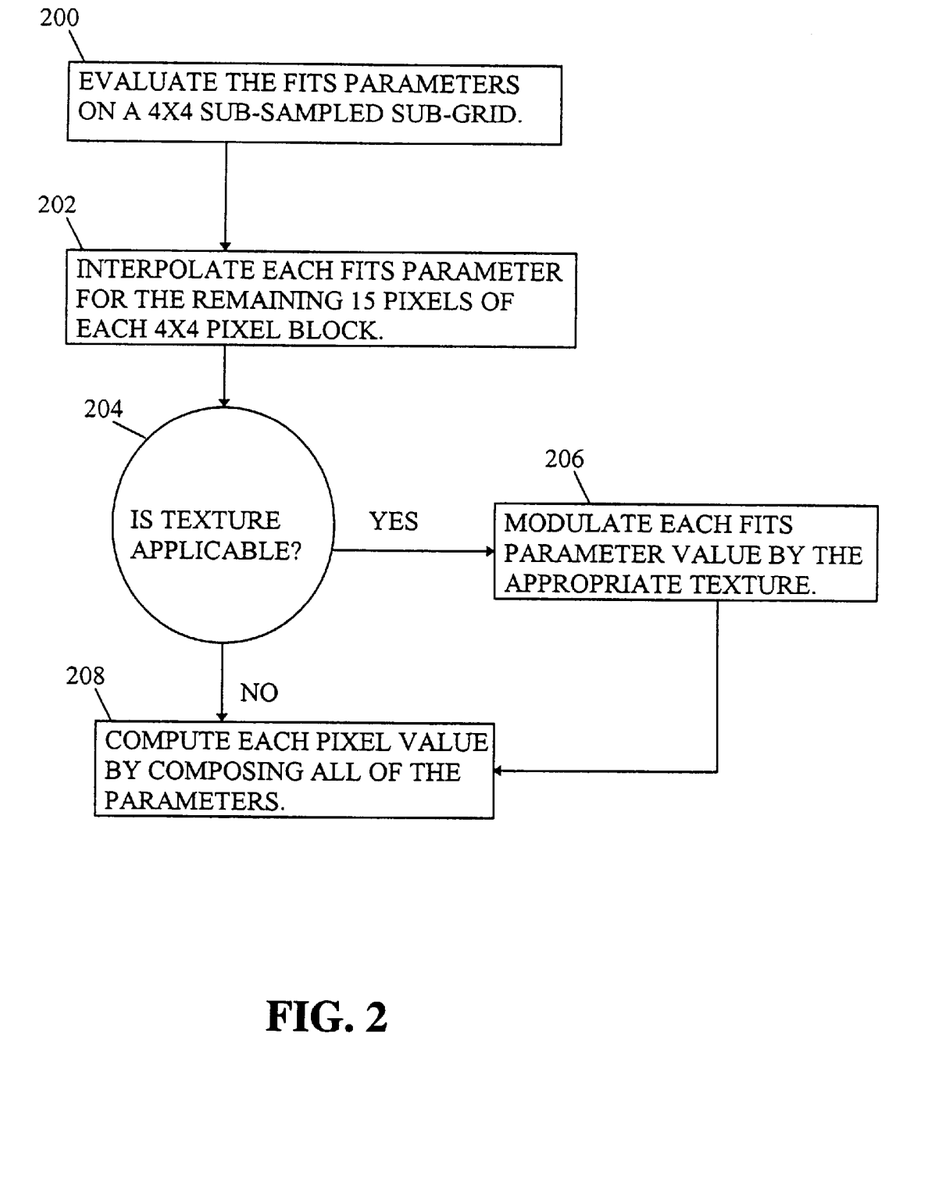
FIG. 2 is a simplified flowchart showing interpolation of FITS parameters, and avoiding interpolation of texture parameters.

FIG. 2 illustrates the application of texture mapping and the impact it has on the FITS RIP in accordance with a preferred embodiment of the present invention. The Figure indicates the distinction between the FITS edit parameters, which are calculated on a coarse grid and then interpolated, and the texture parameters which are not interpolated. At step 200 the edit parameters are evaluated on the pixel sub-grid 102 (FIG. 1). At step 202 these parameters are extended to the full pixel grid 100 (FIG. 1) by interpolation. At step 204 a determination is made whether or not the user wants a texture map to be applied. If so, then at step 206 each of the FITS parameters is modulated by the texture map values at each of the 16 pixel locations within each 4×4 block of pixels. Finally, at step 208 the thus modulated FITS parameters are used to compute the pixel values themselves.

Figure 3:
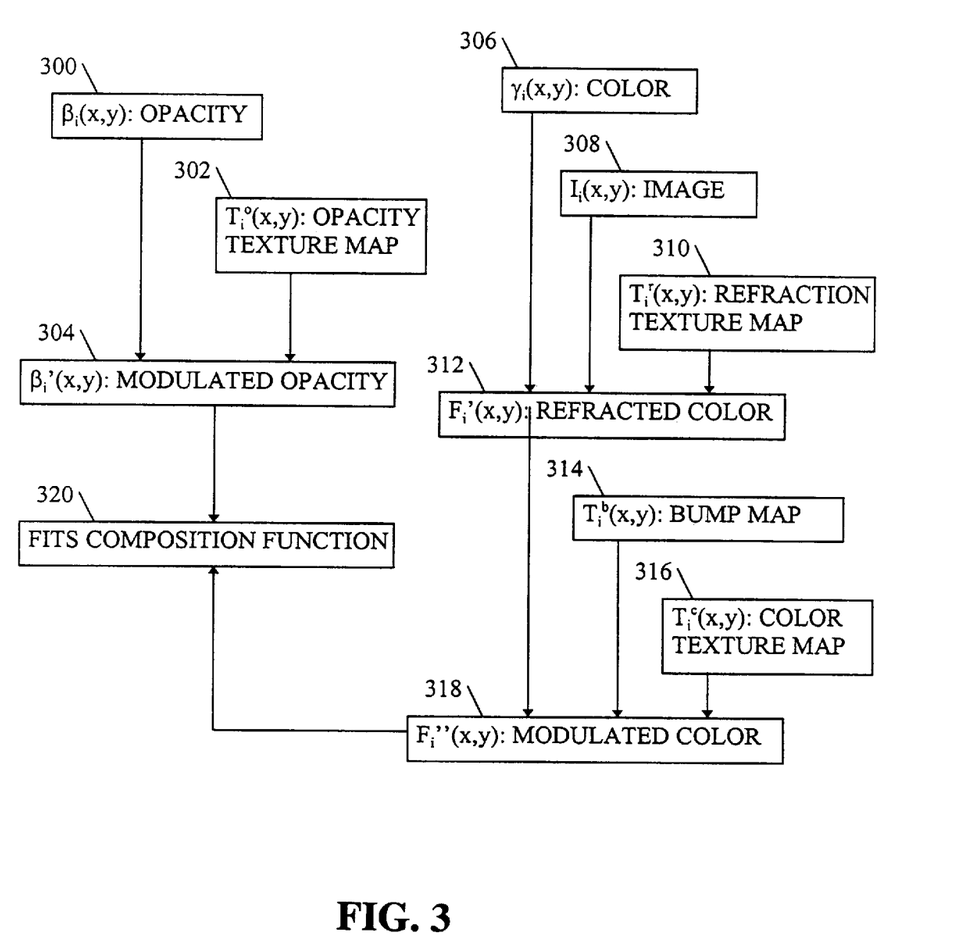
FIG. 3 is a simplified illustration of the interdependencies among the FITS parameters and texture maps, when a FITS RIP is being carried out.

FIG. 3 illustrates the interdependencies of various input units which enter into the FITS RIP composition function. Units 300, 302 and 304 illustrate the opacity parameters $\beta_i(x,y)$ and opacity texture map $T_i^o(x,y)$ used to determine the modulated opacities $\beta_i'(x,y)$. Units 306, 308 and 310 illustrate the imported image $I_i$, external color term $\gamma_i(x,y)$ and a refraction texture map $T_i^r(x,y)$ used to determine the refracted color $F_i'(x,y)$. Units 312, 314 and 16 illustrate the color texture map $T_i^c$ and the surface texture map $T_i^b$ used, along with the refracted color $F_i'(x,y)$, to determine the modulated color $F_i''(x,y)$. The refracted color $F_i'(x,y)$ is the color of the input image read through a refraction map. The modulated color $F_i''(x,y)$ is the color of the input image modified by the color map.

Figure 4:
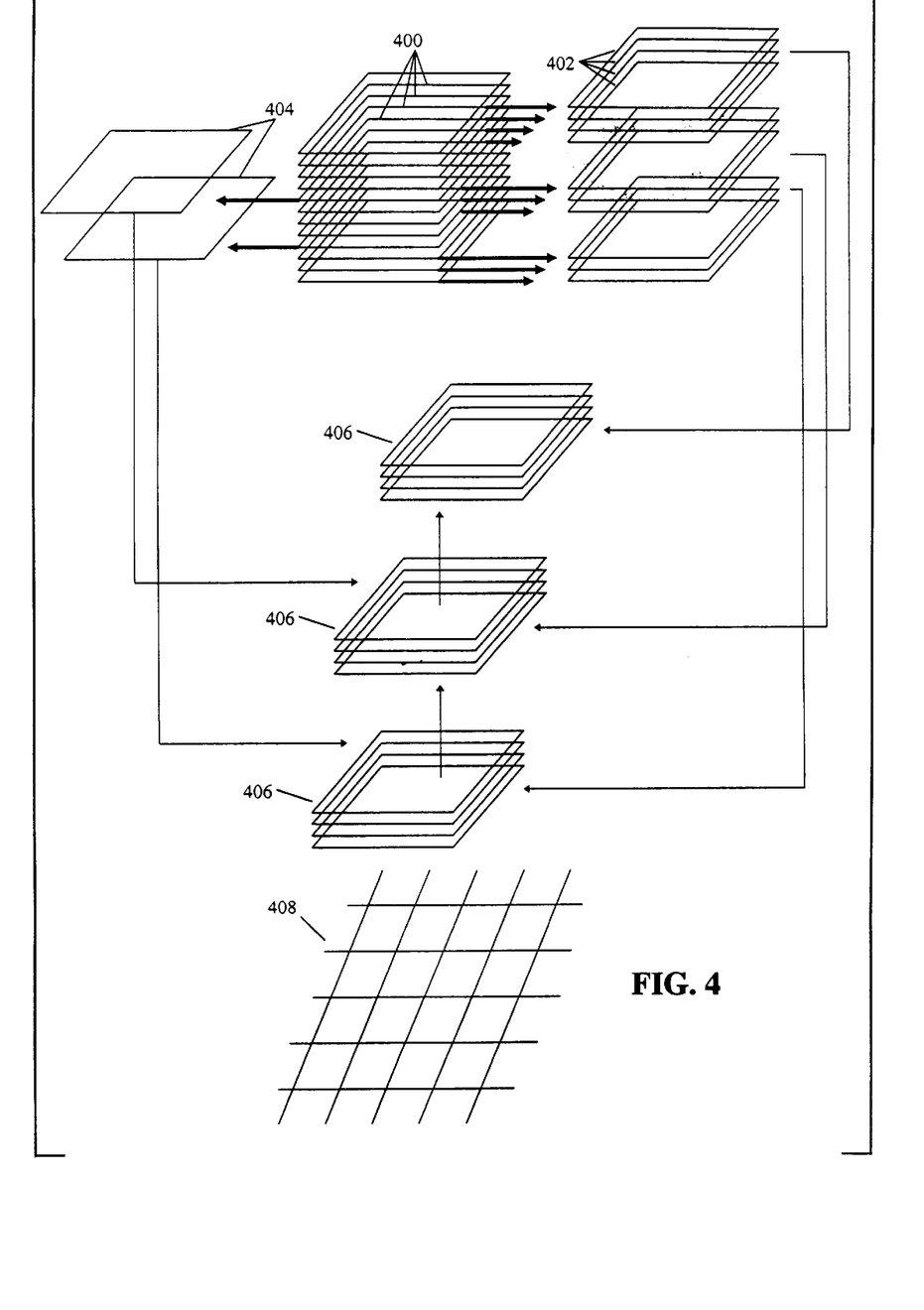
FIG. 4 is a simplified illustration of a layer stack containing interpolable and non-interpolable layers being separated into interpolable and non-interpolable layers which are arranged in sub-stacks of layers linked to one another.

FIG. 4 illustrates a stack 400 of layers, which includes both interpolable layers 402 and non-interpolable layers 404. The interpolable layers, which often are contiguous, are separated from the non-interpolable layers and are arranged into sub-stacks 406, each of which contains a plurality of contiguous interpolable layers onto which is arranged a single non-interpolable layer. It is appreciated that the last sub-stack 406, which contains the layers at the top of the stack 400, may not be capped with a non-interpolable layer, if one is not present.

The sub-stacks 406 are linked to one another, such that the pixel values derived from the lowest sub-stack are used as a starting input in the next higher sub-stack. This procedure is employed all through the stack 400.

Also illustrated is sub-grid 408 used for each sub-stack. The smooth FITS parameters are only evaluated at pixel locations in sub-grids 408. Values of these FITS parameters at other pixel locations are obtained by interpolating the values at pixels located in the sub-grid.

Figure 5:
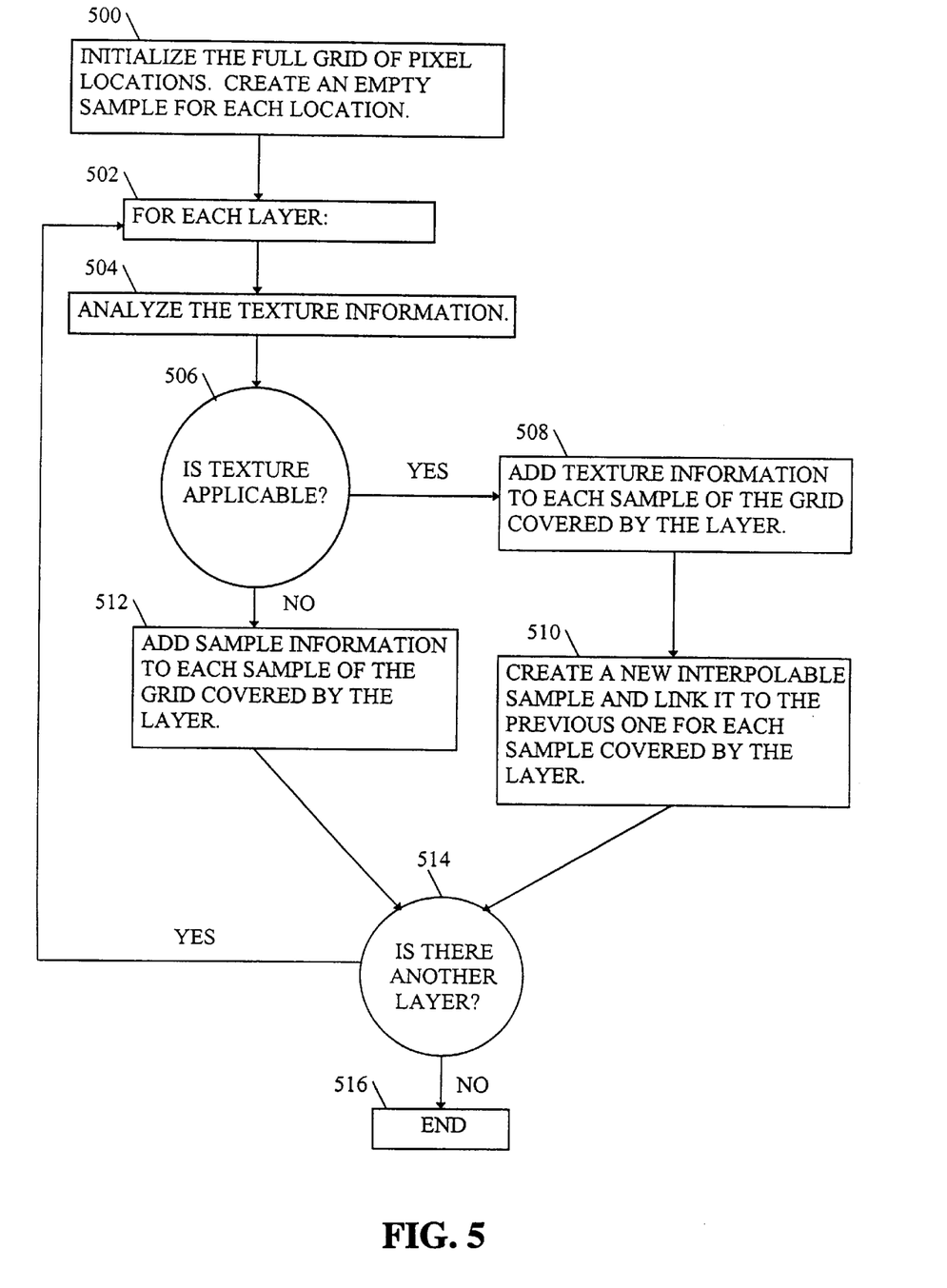
FIG. 5 is a simplified flowchart showing the creation, from a layer stack, of lists of interpolable samples linked to one another.

FIG. 5 illustrates an algorithm creating a list of interpolable samples from a layer stack. At step 500, a grid of pixel locations is initialized, and an empty sample is created at each pixel location. Step 502 initiates a loop for each layer in the layer stack 400 (FIG. 4). At step 504 the texture information for a layer is analyzed. At step 506 a determination is made whether or not a texture map is present upon which the FITS parameters which are interpolated depend; i.e., whether or not the layer is non-interpolable.

If so, at step 508 the textured information is added to each grid sample, and at step 510 a new sample is created and linked to the previous one. Otherwise, at step 512 the sample information is added to each grid sample. Step 514 checks if there is another layer in the layer stack to be processed. If so, execution flows back to step 502. Otherwise, the algorithm ends at step 514.

Although the above discussion references the FITS compositing system, it can be appreciated by those skilled in the art that it applies to any multi-resolution paint system.

A computer listing of software which embodies a preferred embodiment of the present invention is appended hereto as Annex A.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for applying textures to a composite image in a computerized multi-resolution paint system, the method comprising:

obtaining a stack of sequential image rendering layers to be composited, each layer depending recursively on the layer preceding it in the stack, wherein the image rendering layers include image layers containing pixel data at pixel locations within a pixel grid and paint layers containing edit parameters for performing image edit effects;

applying at least one texture map to at least one selected layer in said stack; and partitioning the stack into sequential sub-stacks based on the at least one selected layer, wherein the sub-stacks are linked together in such a way that pixel values derived from the last layer of a sub-stack are used as input in the first layer of the next higher sub-stack, wherein the edit parameters in paint layers other than the at least one selected layer are calculated at selected pixel locations and interpolated for remaining pixel locations within the pixel grid, and wherein each of the at least one selected layer is a last layer of a sub-stack and contains texture data, which data is calculated at each pixel location in the pixel grid.

2. The method of claim 1 and wherein said texture map is selected from texture maps which modulate color, opacity, shape and distortion.

3. The method of claim 1 and wherein said image layers contain images to import into said composite image.

4. The method of claim 1 and wherein said at least one texture map is a procedural texture map.

5. The method of claim 1 and wherein said at least one texture map is an image tiled horizontally and vertically.

6. The method of claim 1 and wherein said at least one texture map is a bump map for modulating shape.

7. The method of claim 1 and wherein said at least one texture map is a distortion map for image refraction.

8. The method of claim 1 and wherein each of said at least one texture map is used in a recursive dependency relating each of said at least one selected layer in said stack to the layer preceding it in the stack.

9. The method of claim 1 and wherein pixel data on said stack of image rendering layers is organized into lists of data linked to one another which are created at each pixel location within said composite image, each list of data corresponding to a sequential sub-stack of layers.

10. The method of claim 9 and wherein said pixel data is stored within a single grid.

11. The method of claim 1 and wherein said multi-resolution paint system is a FITS-based system.

12. A method for image compositing in a computerized system, the method comprising:

obtaining a stack of sequential image rendering layers to be composited, each layer depending recursively on the layer preceding it in the stack, wherein said stack of image rendering layers includes at least one interpolable layer that contains data used to calculate pixel values at locations within a pixel grid, which data is calculated at selected pixel locations and interpolated for remaining pixel locations within the pixel grid, and at least one non-interpolable layer that contains data used to calculate pixel values at locations within the pixel grid, which data is calculated at each pixel location in the pixel grid;

partitioning the stack into sequential sub-stacks based on the at least one non-interpolable layer, wherein the sub-stacks are linked together in such a way that pixel values derived from the last layer of a sub-stack are used as input in the first layer of the next higher sub-stack, and wherein each of the at least one non-interpolable layer is a last layer of a sub-stack; and calculating pixel values at locations within said pixel grid based upon said sequential sub-stacks and based upon data in the interpolable and the non-interpolable layers.

13. The method of claim 12 and wherein said data which is calculated at each pixel location includes texture map data.

14. The method of claim 13 and wherein said texture map data is used to modulate opacity.

15. The method of claim 12 and wherein pixel data on said stack of image rendering layers is organized into lists of data linked to one another which are created at each pixel location within a composite image, each list of data corresponding to a sequential sub-stack of layers.

16. The method of claim 12 and wherein said image rendering layers are layers for a FITS-based raster image processing system.

17. A system for applying textures to a composite image in a computerized multi-resolution paint system, the system comprising:

an image providing unit obtaining a stack of sequential image rendering layers to be composited, each layer depending recursively on the layer preceding it in the stack wherein the image rendering layers include image layers containing pixel data at pixel locations within a pixel grid and paint layers containing edit parameters for performing image edit effects;

a texture mapper applying at least one texture map to at least one selected layer in said stack; and a stack manager partitioning the stack into sequential sub-stacks based on the at least one selected layer wherein the sub-stacks are linked together in such a way that pixel values derived from the last layer of a sub-stack are used as input in the first layer of the next higher sub-stack, wherein the edit parameters in paint layers other than the at least one selected layer are calculated at selected pixel locations and interpolated for remaining pixel locations within the pixel grid, and wherein each of the at least one selected layer is a last layer of a sub-stack and contains texture data, which data is calculated at each pixel location in the pixel grid.

18. The system of claim 17 and wherein said texture map is selected from text maps which modulate color, opacty, shape and distortion.

19. The system of claim 17 and wherein said image layers contain images to import into said composite image.

20. The system of claim 17 and wherein said at least one texture map is a procedural texture map.

21. The system of claim 17 and wherein said at least one texture map is an image tiled horizontally and vertically.

22. The system of claim 17 and wherein said at least one texture map is a bump map for modulating shape.

23. The system of claim 17 and wherein said at least one texture map is a distortion map for image refraction.

24. The system of claim 17 and wherein each of said at least one texture map is used in a recursive dependency relating each of said at least one selected layer in said stack to the layer preceding it in the stack.

25. The system of claim 17 and wherein pixel data on said stack of image rendering layers is organized into lists of data linked to one another which are created at each pixel location within said composite image, each list of data corresponding to a sequential sub-stack of layers.

26. The system of claim 25 and wherein said pixel data is stored within a single grid.

27. The system of claim 17 and wherein said multi-resolution paint system is a FITS-based system.

28. A system for image compositing in a computerized system, the system comprising:

an image provider obtaining a stack of sequential image rendering layers to be composited, each layer depending recursively on the layer preceding it in the stack, wherein said stack of image rendering layers includes at least one interpolable layer that contains data used to calculate pixel values at locations within a pixel grid, which data is calculated at selected pixel locations and interpolated for remaining pixel locations within the pixel grid, and at least one non-interpolable layer that contains data used to calculate pixel values at locations within the pixel grid, which data is calculated at each pixel location in the pixel grid;

a stack manager partitioning the stack into sequential sub-stacks based on the at least one non-interpolable layer wherein the sub-stacks are linked together in such a way that pixel values derived from the last layer of a sub-stack are used as input in the first layer of the next higher sub-stack, and wherein each of the at least one non-interpolable layer is a last layer of a sub-stack; and a pixel value calculator calculating pixel values at locations within said pixel grid based upon said sequential sub-stacks and based upon data in the interpolable and the non-interpolable layers.

29. The system of claim 28 and wherein said data which is calculated at each pixel location includes texture map data.

30. The system of claim 29 and wherein said texture map data is used to modulate opacity.

31. The method of claim 28 and wherein pixel data on said stack of image rendering layers is organized into lists of data linked to one another which are created at each pixel location within a composite image, each list of data corresponding to a sequential sub-stack of layers.

32. The system of claim 28 and wherein said image rendering layers are layers for a FITS-based raster image processing system.

\* \* \* \* \*